United States Patent [19]

Nimylowycz

[11] 3,913,873
[45] Oct. 21, 1975

[54] MECHANICAL SPREADER FOR A PARACHUTE

[75] Inventor: Osyp Nimylowycz, Philadelphia, Pa.

[73] Assignee: The United States of America as represented by the Secretary of the Army, Washington, D.C.

[22] Filed: Jan. 2, 1975

[21] Appl. No.: 538,049

[52] U.S. Cl. .............................................. 244/149
[51] Int. Cl.² ........................................ B64D 17/54
[58] Field of Search ............ 244/142, 149, 152, 147

[56] References Cited
UNITED STATES PATENTS

| | | | |
|---|---|---|---|
| 2,953,333 | 9/1960 | Stencel | 244/147 |
| 3,291,423 | 12/1966 | Britton | 244/149 |
| 3,423,054 | 1/1969 | Stencel | 244/149 |
| 3,790,113 | 2/1974 | Nimylowycz et al. | 244/149 |

*Primary Examiner*—Trygve M. Blix
*Assistant Examiner*—Barry L. Kelmachter
*Attorney, Agent, or Firm*—Nathan Edelberg; Robert P. Gibson; Vincent W. Cleary

[57] ABSTRACT

A parachute arrangement having a mechanical parachute spreader positioned internally of the canopy skirt and connected at an upper end plug thereof by a lanyard to the canopy apex. An initiator firing pin mounted in the lower end of the spreader is connected by a firing lanyard to a load when deployed. A plurality of wedge-shaped slugs, each attached to parachute suspension lines, are initially latched to a spring biased longitudinal sleeve within the mechanical spreader. Upon compression of the springs and release of the slugs, a two-part cylindrical housing, slidable on a cartridge chamber and integral piston, is actuated by pressure gases generated from a propellant charge to eject the slugs radially outward and assist the suspension lines in opening the parachute canopy skirt. The upper surface of each slug contains a compression spring which is in contact with the housing camming surface to facilitate assembly and disassembly of the slugs individually.

7 Claims, 2 Drawing Figures

MECHANICAL SPREADER FOR A PARACHUTE

The invention described herein may be manufactured, used and licensed by or for the Government for governmental purposes without the payment to me of any royalty thereon.

This invention relates to parachute apparatus and more particularly to a parachute arrangement that upon deployment facilitates a rapid opening of the parachute canopy skirt.

One of the objects of the invention is to provide a rapid opening parachute arrangement which is economical to produce and of relatively simple construction.

Another object of the invention is to provide such an arrangement having a centrally positioned mechanical spreader which will not hinder normal aerodynamic parachute inflation should the spreader misfire.

A further object of the invention is to provide such an arrangement in which the mechanical spreader has wedge-shaped slugs that can be assembled and disassembled individually while the remainder of the arrangement remains assembled with the safety pin operatively in place.

These and other objects features and advantages will become more apparent from the following description and accompanying drawings in which.

Figure 1:
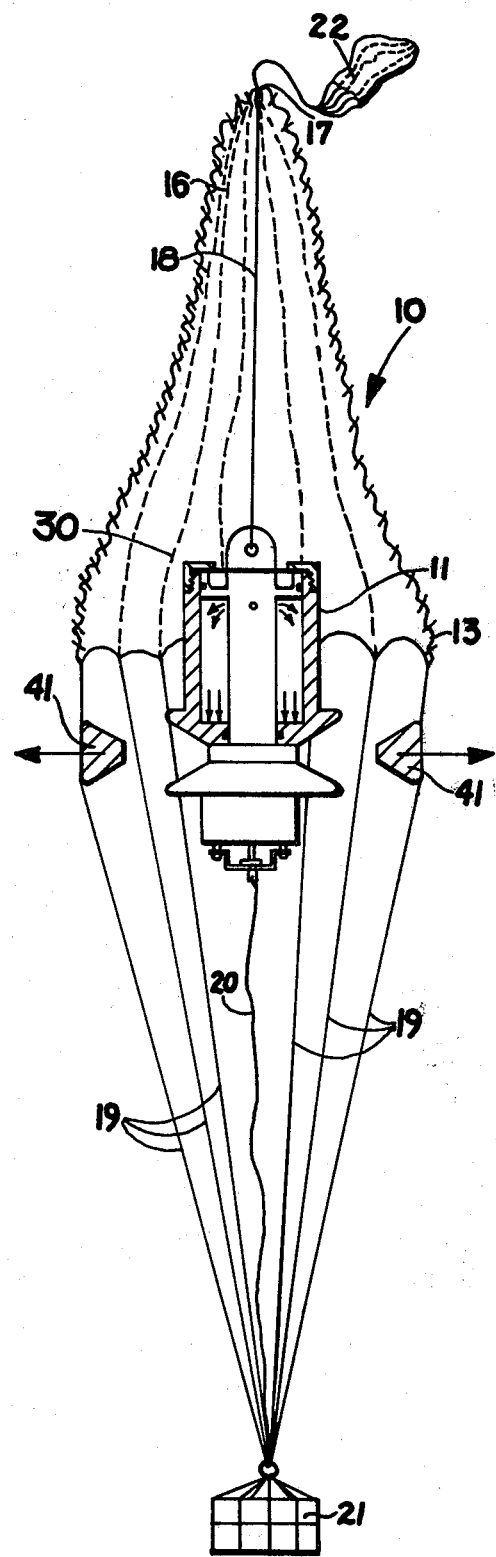
FIG. 1 is an elevational sectional view of a deployed parachute arrangement embodying the principles of the invention.
Figure 2:
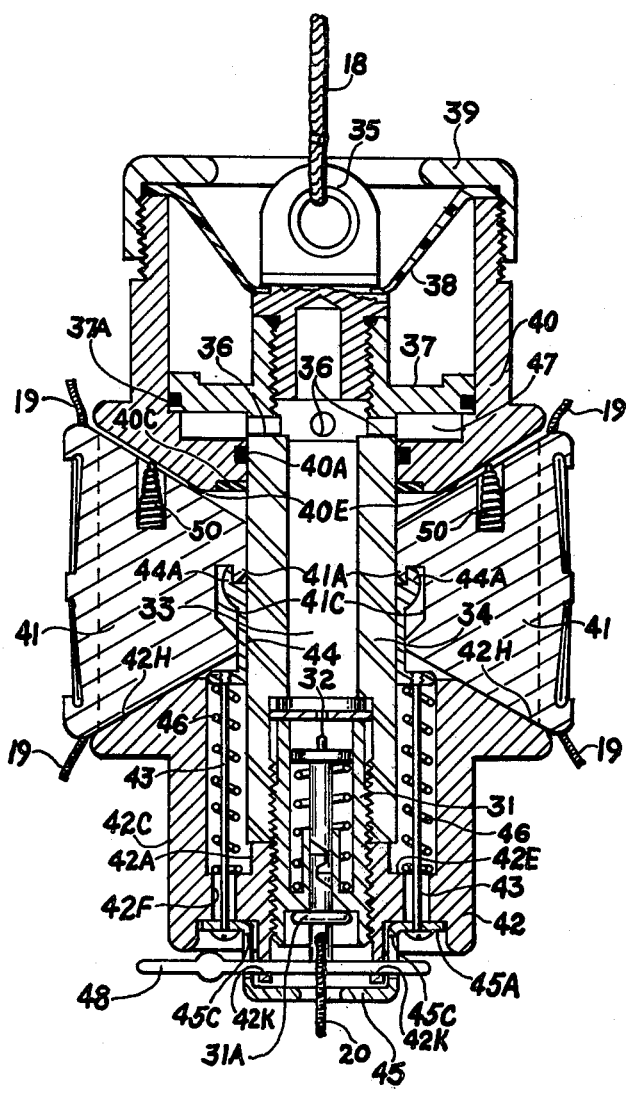
FIG. 2 is an enlarged sectional view of the FIG. 1 mechanical parachute spreader prior to actuation thereof.

The parachute arrangement, shown generally at 10 (FIG. 1), has a mechanical parachute spreader 11 suspended by lanyard 18 (FIGS. 1, 2) from the apex 17 of parachute canopy 16 to center or be normally positioned within the canopy skirt portion 13. The lower end of the mechanical spreader 11 is appropriately attached by a firing lanyard 20 to a predetermined load 21, for example, cargo under delivery or the harness of an ejected aircraft occupant. When taut, the firing lanyard 20, which is of less length than each of the suspension lines 19 that connect the canopy skirt portion 13 to the load 21, actuates a sear pin 31A of an initiator 31 in a manner to be described upon operation of the drogue chute or drogue gun 22 which is affixed to the canopy apex 17 externally of the parachute 16. The effective or total taut length of the firing lanyard 20, spreader unit 11 and lanyard 18 is less than those of each of the suspension lines 19 and their corresponding collapsed parachute canopy length at the moment the drogue chute 22 opens.

The firing pin 32 of the initiator or firing mechanism 31, by striking a suitable primer in cartridge 33, ignites the cartridge propellant charge which is suitably located in the vertically oriented cartridge chamber 34 that is internally threaded at its lower end for securement of the externally threaded initiator housing. The upper end of chamber 34 is threadedly sealed by plug 35 and has a plurality of circumferentially spaced lateral passages 36 immediately below the annular piston 37 which is integral with chamber 34. Plug 35 is apertured at its tip for attachment of lanyard 18 and has a suitable external annular groove by which the inner portion of rubber disc membrane 38 is secured. The outer end of membrane or diaphram 38 is appropriately secured between the inverted cup 39 and the upper end of housing 40 that is threadedly connected thereto and is slidably mounted on chamber 34. The internal surface of housing 40 is slidable on piston 37 that has a suitable peripheral O-ring seal 37A. The lower open end of housing 40 carries O-ring seal 40A and, on its innermost undersurface, an annular washer 40C of polyethylene material for a purpose to be described. A plurality of peripherally spaced wedge-shaped slugs 41, each of which is appropriately secured to predetermined ones of the suspension lines 19, are mounted immediately below the housing conical camming surface 40E in a manner to be described. The base portion of cup 39 is centrally apertured to provide the upper end of plug 35 with sufficient clearance for operational movement therethrough.

An annular closure member 42 has a short cylindrical inner wall 42A that is threadedly secured to initiator 31 and preferably in abutment with the lower end of cartridge chamber 34 and a cylindrical external wall 42C, defining therebetween an upwardly opening annular chamber or recess 42E. The base portion of the annular member 42 has a plurality (preferably four) of apertures 42F that each intersect or are in alignment with annular recess 42E and freely accommodate motion of a corresponding elongated bolt 43 that is threadedly secured to a base portion of cylindrical sleeve 44 which is slidably mounted on cartridge chamber 34. The head of each bolt 43 supports a suitably apertured annular flange portion 45A of cap member 45. Surrounding each bolt 43 is a corresponding compression spring 46 that extends between the base of sleeve 44 and the base of annular chamber 42E. The upper end of closure member 42 has a conical camming surface 42H that abuts the lower inclined surfaces of assembled trapezoidal or wedge-shaped slugs 41, and the upper end of upwardly biased cylindrical sleeve has an external annular latching flange 44A that upon assembly, matingly engages with and supports a similar hook portion 41A provided in the upper end of an inwardly opening recess 41C contained in each slug 41. The annular latching flange 44A is appropriately relieved to define an innermost groove or recess that accommodates the slug hook portions 41A which, in turn each define a suitable groove in the upper end of the corresponding slug recess 41C to likewise receive the respective portions of latching flange 44A. The lower wall of each slug recess 41C is inclined for operative camming or initial slug releasing action by the rounded external lower surface of the latching flange 44A when spring 46 is compressed after safety pin 48 has been manually withdrawn from each aligned pair of the diametrically opposed lateral openings 42K, 45C in closure 42 and cap 45 and after actuated initiator sear pin 31A strikes and forces the cap 45 downwardly as initiator 31 is fired or actuated by firing lanyard 20. The central opening in cap 45, through which firing lanyard 20 passes, is of smaller dimension than sear pin 31A.

The aforementioned housing or piston washer 40C overlies and protects the annular latching flange 44A when the subsequently extended compression spring means 46 are released and the gas expansion chamber 47 drives the housing or piston 40 to cam or eject the slugs 41 and respective suspension lines 19 radially outward to rapidly initiate aerodynamic inflation of the parachute canopy 16.

The upper surface of each slug 41 has an upwardly opening recess in which is seated or corresponding relatively small compression spring 50 of predetermined length that, on assembly, will have a length slightly greater than the depth of its recess as it engages camming surface 40E and biases the respective slug 41 downwardly against camming surface 42H and into latching engagement with the latching flange 44A.

The diametrically opposed openings 45C are substantially larger than openings 42K to the extent that predetermined vertical elongations thereof below and above the assembled safety pin 48 enable access by a screw driver or the like into a slot or opening 45C below the safety pin to temporarily lower the cap 45 and slightly compress springs 46, thereby lowering sleeve 44 sufficiently to unlatch slugs 41 for the purpose of enabling disassembling and assemblying of the slugs individually as each assembled slug 41 is frictionally held in place by its spring 50 and the remainder of the arrangement remains assembled with the safety pin 48 operatively in place.

Various modifications, alterations or changes may be resorted to without departing from the scope of the invention as defined in the appended claims.

I claim:

1. In a parachute arrangement having a canopy skirt depending from a canopy apex, a drogue chute secured to said canopy apex and located externally of said canopy skirt, and a plurality of suspension lines each having one end connected to said canopy skirt and another end with means for attachment to a load, a lanyard having one end connected to said canopy apex and another end secured to a plug integral with an upper end of a mechanical parachute spreader positioned internally of said parachute skirt, a firing lanyard having one end connected to an actuating pin of initiator secured in a lower end of said spreader, end means on the other end for attachment to said load, said spreader having an elongated cartridge chamber that is internally threaded at its lower end by which said initiator is secured, said chamber having at its upper end an annular piston integral therewith and a plurality of lateral passages in its sidewall adjacently below said piston, and a propellant cartridge substantially vertically disposed in said chamber intermediate said initiator and lateral passages, a two-part cylindrical housing having a pair of vertically spaced open end portions and slidably receiving said annular piston, the lower of said open end portions slidably mounted on and surrounding said propellant chamber, said housing having a lower conically shaped camming surface, a cylindrically shaped sleeve member slidably mounted on said chamber and having an external annular latching flange, a plurality of wedge-shaped slugs each having an outer surface connected to selected ones of said suspension lines and an inner surface slidably mounted on said propellant chamber, each of said inner surfaces having a recess and groove arrangement accommodating portions of said annular latching flange, and means resiliently biasing said sleeve latching flange and said slugs upwardly toward said housing piston camming surface, so constructed and arranged that upon compression of said biasing means, ignited propellant gases will drive said housing downwardly and eject said slugs substantially radially outward to assist the attached suspension lines in opening the parachute canopy skirt.

2. The structure in accordance with claim 1 wherein said resiliently biasing means includes an annular member secured to said initiator, said annular member having an upper conically shaped camming surface engaging the lower surface of each slug and an upwardly opening annular chamber containing compression spring means and adapted to receive a portion of said sleeve member.

3. The structure according to claim 2 wherein each slug recess has a hook portion in its upper wall defining a groove in which portion of said latching flange are seated.

4. The structure according to claim 3 wherein both said annular piston and said lower open end portion carry an O-ring seal, and a rubber disc membrane overlying said annular piston and secured to said plug and housing.

5. The structure according to claim 4 wherein an upper surface of each slug has an upwardly opening recess containing a compression spring in contact with said housing camming surface.

6. The structure of claim 5 wherein an undersurface of said housing carries an annular washer overlying said latching flange.

7. The structure of claim 1 wherein said biasing means includes means actuated by a sear pin on said initiator for unlatching said latching flange from said slugs.

* * * * *